United States Patent
Geissler et al.

(10) Patent No.: US 10,900,128 B2
(45) Date of Patent: Jan. 26, 2021

(54) USE OF SULFONIUM SALTS AS CORROSION INHIBITORS

(71) Applicant: ChampionX USA Inc., Sugar Land, TX (US)

(72) Inventors: Brett Geissler, Richmond, TX (US); Ashish Dhawan, Aurora, IL (US); Alicia Dinges, Houston, TX (US); Carter Martin Silvernail, Burnsville, MN (US)

(73) Assignee: ChampionX USA Inc., Sugar Land, TX (US)

( * ) Notice: Subject to any disclaimer, the term of this patent is extended or adjusted under 35 U.S.C. 154(b) by 0 days.

(21) Appl. No.: 16/116,669

(22) Filed: Aug. 29, 2018

(65) Prior Publication Data

US 2020/0071840 A1    Mar. 5, 2020

(51) Int. Cl.
*C23F 11/16*       (2006.01)
*C09K 8/54*       (2006.01)

(52) U.S. Cl.
CPC ............... *C23F 11/16* (2013.01); *C09K 8/54* (2013.01); *C09K 2208/22* (2013.01); *C09K 2208/26* (2013.01); *C09K 2208/32* (2013.01)

(58) Field of Classification Search
None
See application file for complete search history.

(56) References Cited

U.S. PATENT DOCUMENTS

| | | | |
|---|---|---|---|
| 2,066,925 A | 1/1937 | Yabroff et al. | |
| 2,596,450 A | 5/1952 | Wachter et al. | |
| 2,807,648 A | 9/1957 | Pitt | |
| 2,941,949 A | 6/1960 | Saukaitis | |
| 2,947,691 A | 8/1960 | Bennett et al. | |
| 3,277,008 A | 10/1966 | Heit | |
| 3,300,375 A | 1/1967 | Wehner | |
| 3,538,229 A | 11/1970 | Ratts | |
| 3,668,137 A | 6/1972 | Gardner | |
| 4,180,469 A | 12/1979 | Anderson | |
| 4,374,066 A | 2/1983 | Crivello et al. | |
| 4,400,541 A | 8/1983 | Iyer | |
| 4,451,409 A | 5/1984 | Buske et al. | |
| 4,659,594 A | 4/1987 | Wu | |
| 4,864,075 A | 9/1989 | Thompson et al. | |
| 5,320,805 A | 6/1994 | Kramer et al. | |
| 5,397,398 A | 3/1995 | Van Vlahakis et al. | |
| 6,214,777 B1 | 4/2001 | Li et al. | |
| 6,756,013 B1 | 6/2004 | Cornell et al. | |
| 7,493,955 B2 | 2/2009 | Gupta et al. | |
| 8,177,963 B2 | 5/2012 | Greaney et al. | |
| 8,821,805 B2 | 9/2014 | Luo et al. | |
| 9,127,239 B2 | 9/2015 | Garner | |
| 9,279,086 B2 | 3/2016 | Hardacre et al. | |
| 2004/0179066 A1 | 9/2004 | Arita et al. | |
| 2005/0148679 A1 | 7/2005 | Chiu et al. | |
| 2010/0022801 A1 | 1/2010 | Shinya | |
| 2010/0256019 A1 | 10/2010 | Aston et al. | |
| 2011/0031165 A1 | 2/2011 | Karas et al. | |
| 2011/0118165 A1 | 5/2011 | Lee | |
| 2011/0192639 A1 | 8/2011 | Shinya et al. | |
| 2011/0282114 A1 | 11/2011 | Luo et al. | |
| 2012/0034313 A1 | 2/2012 | Wrangham et al. | |
| 2013/0004378 A1 | 1/2013 | Luo et al. | |
| 2013/0154129 A1 | 6/2013 | Sul et al. | |
| 2014/0005301 A1 | 1/2014 | Kunimoto et al. | |
| 2014/0371495 A1 | 12/2014 | Anderson et al. | |
| 2015/0080271 A1 | 3/2015 | De Wolf et al. | |
| 2015/0107832 A1 | 4/2015 | DeWolf et al. | |
| 2015/0191659 A1 | 7/2015 | Anderson et al. | |
| 2016/0032177 A1 | 2/2016 | Howe et al. | |
| 2016/0137904 A1 | 5/2016 | Drake et al. | |
| 2016/0222762 A1 | 8/2016 | Geissler et al. | |
| 2017/0329227 A1 | 11/2017 | Ohashi et al. | |

FOREIGN PATENT DOCUMENTS

| | | |
|---|---|---|
| DE | 19610745 A1 | 9/1997 |
| EP | 0 013 462 A1 | 7/1980 |
| FR | 2467547 A1 | 4/1981 |
| FR | 2476078 A1 | 8/1981 |
| GB | 464330 | 4/1937 |
| GB | 2294902 A | 5/1996 |
| JP | 2006-232800 | 9/2006 |
| JP | 2008044881 A | 2/2008 |
| JP | 2013185017 | 9/2013 |
| WO | 01/23504 A1 | 4/2001 |
| WO | 2007/101397 A1 | 9/2007 |
| WO | 2008/016662 A2 | 2/2008 |

(Continued)

OTHER PUBLICATIONS

Akhtar, S.R. et al., Synthesis of Aryl-Substituted Sulfonium Salts by the P2O5-Methanesulfonic Acid Promoted Condensation of Sulfoxides with Aromatic Compounds, J. Org. Chem. 1990, 55, pp. 4222-4225.
Atta, Ayman M. et al., A New Green Ionic Liquid-Based Corrosion Inhibitor for Steel in Acidic Environments, Molecules 2015, 20, pp. 11131-11153.
Crowe, Curtis W. et al., Acid Corrosion Inhibitor Adsorption and its Effect on Matrix Stimulation Results, Society of Petroleum Engineers AIME (SPE 10650) (1982), pp. 59-65.
Frenier, Wayne W. et al., A Mechanistic Study of Sulfonium Salts Acting as Ferric Ion Corrosion Inhibitors, Corrosion-NACE, vol. 36, No. 7, Jul. 1980, pp. 323-327.

(Continued)

*Primary Examiner* — Katie L. Hammer
(74) *Attorney, Agent, or Firm* — Stinson LLP

(57) ABSTRACT

The present invention generally relates to the use of aryl sulfonium salts as a corrosion inhibitor in a water injection system, a hydrocarbon extraction system, or a hydrocarbon production system. Treating oilfield injection and produced fluids with aryl sulfonium salts can significantly decrease microbially induced corrosion. Thus, these aryl sulfonium salts can be effectively used as corrosion inhibitors in oilfield fluids.

19 Claims, 2 Drawing Sheets

(56) References Cited

FOREIGN PATENT DOCUMENTS

| WO | 2011/037773 A2 | 3/2011 |
|---|---|---|
| WO | 2012/120278 A1 | 9/2012 |
| WO | 2014/165813 A1 | 10/2014 |

OTHER PUBLICATIONS

Jellali, Rachid et al., Antifouling activity of novel polyisoprene-based coatings made from photocurable natural rubber derived oligomers, Progress in Organic Coatings 76 (2013), pp. 1203-1214.

Ledovskikh, V.M., Influence of Spatial Structure on the Inhibiting Properties of Monofunctional and Polyfunctional Organic Substances, English translation of Zaschita Metallov, vol. 18, No. 4, pp. 494-497 (Jul.-Aug. 1982).

Martinez-Palou, Rafael et al., Perspectives of Ionic Liquids Applications for Clean Oilfield Technologies, Ionic Liquids: Theory, Properties, New Approaches, www.intechopen.com, (Feb. 2011), pp. 567-630.

Rostami, A. et al., Review and Evaluation of Corrosion Inhibitors Used in Well Stimulation, Society of Petroleum Engineers 121726 (2009), pp. 1-17.

Shiraishi, Yasuhiro et al., A Novel Desulfurization Process for Fuel Oils Based on the Formation and Subsequent Precipitation of S-Alkylsulfonium Salts. 2. Catalytic-Cracked Gasoline, Ind. Eng. Chem. Res. 2001, 40, pp. 1225-1233.

Shiraishi, Yasuhiro et al., A Novel Desulfurization Process for Fuel Oils Based on the Formation and Subsequent Precipitation of S-Alkylsulfonium Salts. 1. Light Oil Feedstocks, Ind. Eng. Chem. Res. 2001, 40, pp. 1213-1224.

Sun, Wenjie et al., Biodegradability, Cytotoxicity, and Physicochemical Treatability of Two Novel Perfluorooctane Sulfonate-Free Photoacid Generators, Arch Environ Contam Toxicol (2013) 64 pp. 187-197.

"Bacteria in the Oil Field" Currents in Research and Technology, The Technical Review, vol. 37, No. 1, pp. 48-53 (1989).

SciFinder, Notes from PCT International Application 2002048101, Jun. 20, 2002, 3 pages.

The Technical Review, PVT Analysis for Oil Reservoirs, Reservoir of Engineering, vol. 37, No. 1 (Jan. 1989), 53 pages.

Scendo, M. et al., The Effect of Ionic Liquids on the Corrosion Inhibition of Copper in Acidic Chloride Solutions, International Journal of Corrosion, vol. 2011, Article ID 718626 (2010), 14 pages.

Scendo, M. et al., Inhibition Effect of 1-Butyl-4-Methylpyridinium Tetrafluoroborate on the Corrosion of Copper in Phosphate Solutions, International Journal of Corrosion, vol. 2011, Article ID 761418 (2011), 13 pages.

Uehara, Jun et al., A Surface-Enhanced Raman Spectroscopy Study on Adsorption of Some Sulfur-Containing Corrosion Inhibitors on Iron in Hydrochloric Acid Solutions, J. Electrochem. Soc., vol. 138, No. 11, Nov. 1991, pp. 3245-3251.

International Search Report and Written Opinion dated Nov. 15, 2019 relating to PCT Application No. PCT/US2019/048715, 12 pages.

USE OF SULFONIUM SALTS AS CORROSION INHIBITORS

FIELD OF THE INVENTION

The present invention generally relates to the use of aryl sulfonium salts as corrosion inhibitors for surfaces that contact hydrocarbon fluids.

BACKGROUND OF THE INVENTION

Microbe growth in hydrocarbon fluids is a major problem in the oil and gas industry. Microbial growth directly, or indirectly through byproduct generation, can lead to safety and environmental problems as well as plugging and corrosion (e.g., microbiologically induced corrosion) that can lead to the premature abandonment of the oil and gas field.

One particular source of microbiologically induced corrosion occurs with the introduction of sulfate- and sulfur-containing waters (such as seawater) into an anaerobic environment which can lead to the formation of undesirable sulfur-containing compounds, particularly hydrogen sulfide, by sulfur-utilizing prokaryotes indigenous to the environment or introduced along with the aqueous solutions.

Thus, a need exists for an effective and efficient method to prevent and reduce corrosion in systems contacting hydrocarbons. In particular, a need exists for an effective and efficient method to prevent and reduce microbiologically induced corrosion by reducing levels of corrosive biogenic products or by reducing the growth of or viability of the microbes that produce corrosive species in the system.

SUMMARY OF THE INVENTION

Methods of inhibiting corrosion at a surface are disclosed. The methods comprise contacting the surface with an effective amount of an anticorrosion composition comprising an aryl sulfonium salt or mixture of aryl sulfonium salts, wherein the surface is in contact with a hydrocarbon-containing fluid.

For the methods of inhibiting corrosion herein, the anticorrosion composition can be effective to reduce microbially induced corrosion.

In the methods described herein, the aryl sulfonium salt can comprise a cation of Formula 1 or 2, or a dication of Formula 3

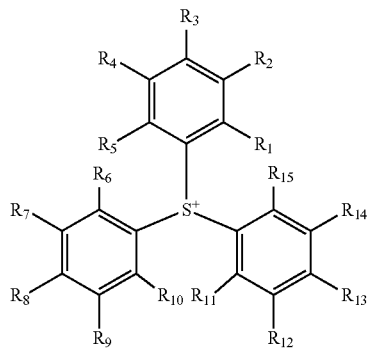

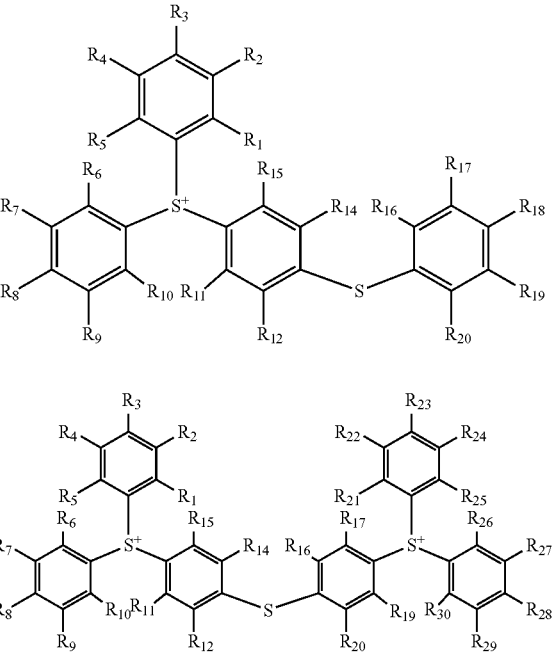

wherein $R_1$-$R_{30}$ are independently hydrogen, alkyl, alkoxy, aryl, or heterocyclo.

In these methods, the aryl sulfonium salt can comprise a cation of Formula 1.

In these methods, the aryl sulfonium salt can comprise a cation of Formula 2.

In these methods, the aryl sulfonium salt can comprise a dication of Formula 3.

In these methods, the aryl sulfonium salt can comprise a cation of Formulae 1 and 2.

In these methods, the aryl sulfonium salt can comprise a cation of Formula 1 and a dication of Formula 3.

In these methods, the aryl sulfonium salt can comprise a cation of Formula 2 and a dication of Formula 3.

In these methods, the aryl sulfonium salt can comprise a cation of Formulae 1 and 2, and a dication of Formula 3.

In the methods, one to six of $R_1$-$R_{30}$ can independently be alkyl and the balance can be hydrogen.

In the methods, one to three of $R_1$-$R_{30}$ can independently be alkyl and the balance can be hydrogen.

In the methods, $R_1$-$R_{30}$ can be hydrogen.

In the methods, the counterion for the aryl sulfonium salt can be chloride, bromide, fluoride, iodide, nitrate, perchlorate, sulfonate, carbonate, chromate, hexafluoroarsenate, hexafluorophosphate, p-toluenesulfonate, acetate, formate, oxalate, phosphate, or a combination thereof.

In the methods, the anticorrosion composition comprising the aryl sulfonium salt can be contacted with a liquid contacting the surface. The concentration of the aryl sulfonium salt can be from about 1 ppm to about 2000 ppm based on the total weight of the liquid. In some instances, the concentration of the aryl sulfonium salt can be from about 5 ppm to about 500 ppm based on the total weight of the liquid.

In these methods, the aryl sulfonium salt can comprise triarylsulfonium chloride, triarylsulfonium nitrate, triarylsulfonium bromide, triarylsulfonium iodide, triarylsulfonium hexafluorophosphate, triarylsulfonium perchloroate, triarylsulfonium hexafluoroarsenate, triarylsulfonium p-toluenesulfonate, triarylsulfonium acetate, triarylsulfonium phosphate, diaryl (4-phenylthio)arylsulfonium chloride, diaryl (4-phenylthio)arylsulfonium nitrate, diaryl (4-phenylthio)arylsulfonium bromide, diaryl (4-phenylthio) arylsulfonium iodide, diaryl (4-phenylthio)arylsulfonium hexafluorophosphate, diaryl (4-phenylthio)arylsulfonium perchloroate, diaryl (4-phenylthio)arylsulfonium hexafluoroarsenate, diaryl (4-phenylthio)arylsulfonium p-toluenesulfonate, diaryl (4-phenylthio)arylsulfonium acetate, diaryl (4-phenylthio)arylsulfonium phosphate, (thiodi-4,1-phenylene)bis-diarylsulfonium dichloride, (thiodi-4,1-phenylene)bis-diarylsulfonium dichloride dinitrate, (thiodi-4,1-phenylene)bis-diarylsulfonium dichloride dibromide, (thiodi-4,1-phenylene)bis-diarylsulfonium dichloride diiodide, (thiodi-4,1-phenylene)bis-diarylsulfonium dihexafluorophosphate, (thiodi-4,1-phenylene)bis-diarylsulfonium diperchloroate, (thiodi-4,1-phenylene)bis-diarylsulfonium dihexafluoroarsenate, diaryl (thiodi-4,1-phenylene)bis-diarylsulfonium di-p-toluenesulfonate, (thiodi-4,1-phenylene) bis-diarylsulfonium diacetate, (thiodi-4,1-phenylene)bis-diarylsulfonium diphosphate, or a combination thereof.

In these methods, the aryl sulfonium salt can be aryl sulfonium chloride, diphenyl (4-phenylthio)phenylsulfonium chloride, (thiodi-4,1-phenylene)bis-diphenylsulfonium dichloride, or a combination thereof.

In the methods the aryl sulfonium salt can comprise aryl sulfonium chloride.

In the methods, the aryl sulfonium salt can comprise diphenyl(4-phenylthio)phenylsulfonium chloride.

In the methods, the aryl sulfonium salt can comprise (thiodi-4,1-phenylene)bis-diphenylsulfonium dichloride.

The methods can further comprise administering one or more of an additional corrosion inhibitor, an organic solvent, an asphaltene inhibitor, a paraffin inhibitor, a scale inhibitor, an emulsifier, a water clarifier, a dispersant, an emulsion breaker, a reverse emulsion breaker, a gas hydrate inhibitor, a biocide, a pH modifier, a surfactant, or a combination thereof.

The methods can comprise administering the additional corrosion inhibitor and the additional corrosion inhibitor comprises an imidazoline compound, a pyridinium compound, or a combination thereof.

In other cases, the methods comprise administering the water or the organic solvent, and the organic solvent comprises an alcohol, a hydrocarbon, a cyclic hydrocarbon, an aromatic hydrocarbon, a ketone, an ether, an alkylene glycol, a glycol ether, an amine, an amide, a nitrile, a sulfoxide, an ester, or any combination thereof.

The methods can also comprise administering the organic solvent and the organic solvent comprises methanol, ethanol, propanol, isopropanol, butanol, 2-ethylhexanol, hexanol, octanol, decanol, 2-butoxyethanol, methylene glycol, ethylene glycol, 1,2-propylene glycol, 1,3-propylene glycol, diethyleneglycol monomethyl ether, diethylene glycol monoethyl ether, ethylene glycol monobutyl ether, ethylene glycol dibutyl ether, pentane, hexane, cyclohexane, methylcyclohexane, heptane, decane, dodecane, diesel, toluene, xylene, heavy aromatic naphtha, cyclohexanone, diisobutylketone, diethyl ether, propylene carbonate, N-methylpyrrolidinone, N,N-dimethylformamide, or any combination thereof.

In these methods, the hydrocarbon-containing fluid comprises natural gas or a liquid hydrocarbon.

In the methods described herein, the liquid hydrocarbon comprises crude oil, heavy oil, processed residual oil, bituminous oil, cocker oil, gas oil, fluid catalytic cracker feed or slurry, naphtha, diesel fuel, fuel oil, jet fuel, gasoline, or kerosene.

Other objects and features will be in part apparent and in part pointed out hereinafter.

DESCRIPTION OF THE PREFERRED EMBODIMENTS

Figure 1:
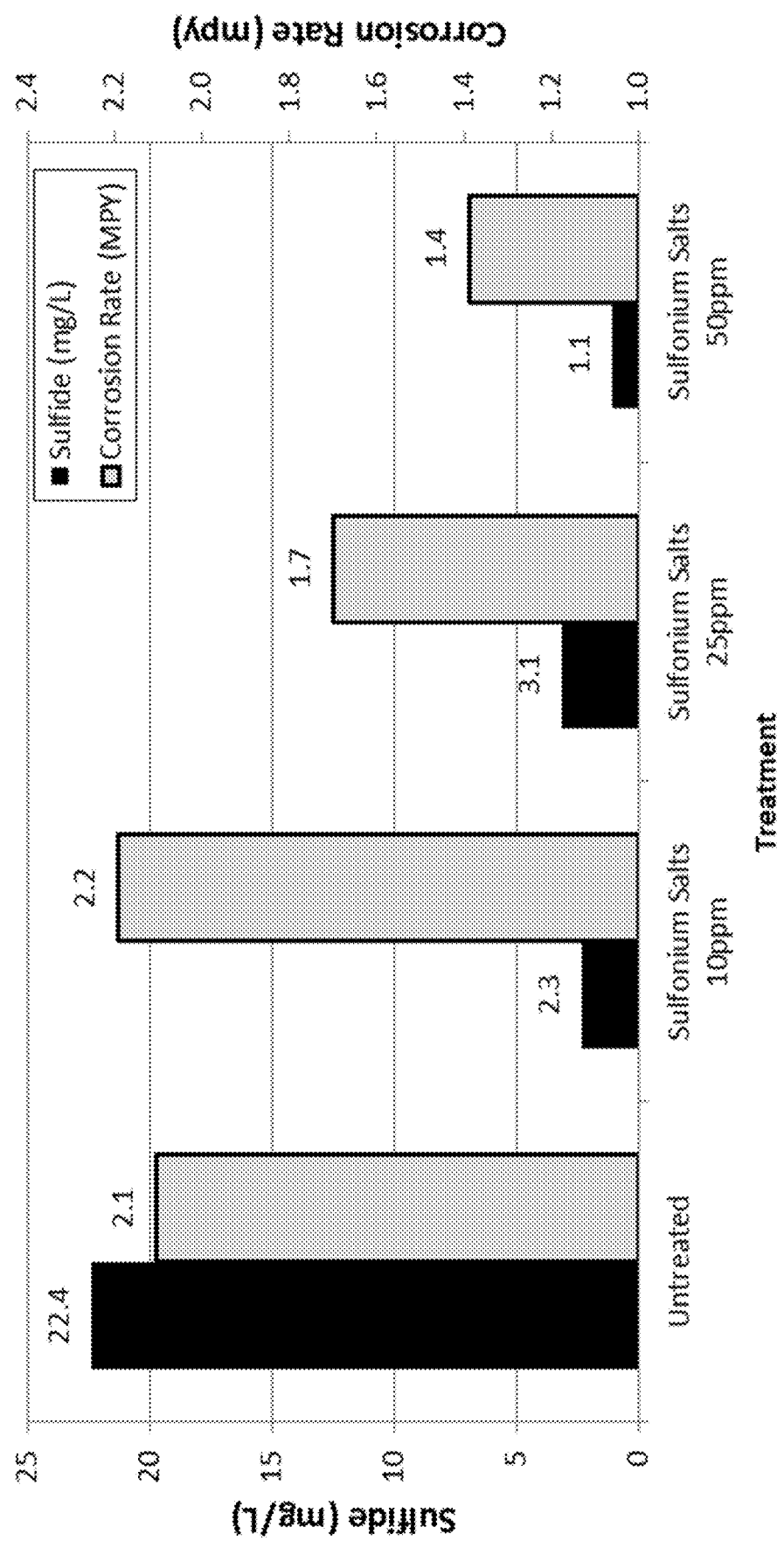
FIG. 1 depicts average sulfide levels and corrosion rates for experiments across different conditions.

The present invention is directed to methods of inhibiting corrosion at a surface comprising contacting the surface with an effective amount of an anti-corrosion composition comprising an aryl sulfonium salt or a mixture of aryl sulfonium salt, wherein the surface is in contact with a hydrocarbon-containing fluid. Oilfield produced fluids or seawater, where each contains high levels of microorganisms, can be treated with aryl sulfonium salts that can significantly decrease the activity of these microorganisms in the fluids. Many of the microorganisms produce hydrogen sulfide by the reduction reaction of sulfur-containing compounds. The build-up of $H_2S$ can lead to microbially induced corrosion (MIC). The treatment with the aryl sulfonium salts can ameliorate MIC by reducing levels of hydrogen sulfide. Thus, these aryl sulfonium salts can be effectively used as corrosion inhibitors in oilfield fluids.

For the methods of inhibiting corrosion herein, the anti-corrosion composition can be effective to reduce microbially induced corrosion.

In the methods described herein, the aryl sulfonium salt can comprise a cation of Formula 1 or 2 or a dication of Formula 3:

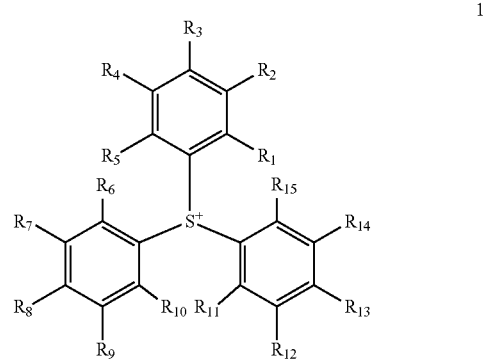

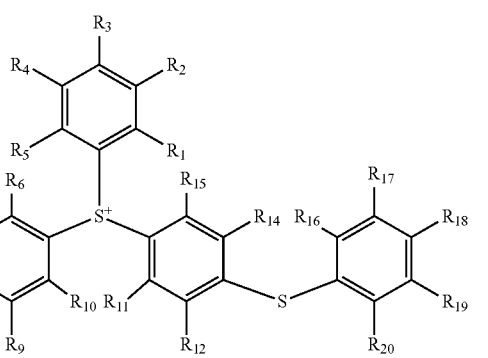

-continued

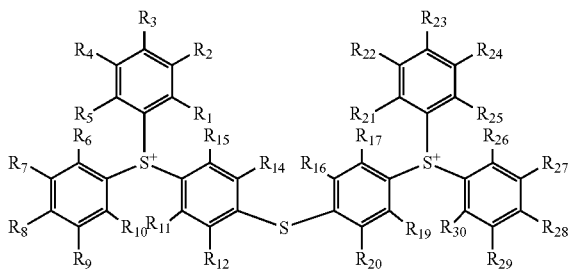

wherein $R_1$-$R_{30}$ are independently hydrogen, alkyl, alkoxy, aryl, or heterocyclo.

For the methods described herein, the aryl sulfonium salt can comprise a cation of Formula 1.

Additionally, the aryl sulfonium salt can comprise a cation of Formula 2.

Further, the aryl sulfonium salt can comprise a dication of Formula 3.

Also, the aryl sulfonium salt can comprise a cation of Formulae 1 and 2.

For the methods herein, the aryl sulfonium salt can comprise a cation of Formula 1 and a dication of Formula 3.

Also, the aryl sulfonium salt can comprise a cation of Formula 2 and a dication of Formula 3.

Additionally, the aryl sulfonium salt can comprise a cation of Formulae 1 and 2, and a dication of Formula 3.

For the aryl sulfonium salts of Formulae 1, 2, and 3, one to six of $R_1$-$R_{30}$ can independently be alkyl and the balance can be hydrogen; further, one to three of $R_1$-$R_{30}$ can independently be alkyl and the balance can be hydrogen; preferably, $R_1$-$R_{30}$ are hydrogen.

For the methods described herein, the counterion for the aryl sulfonium salt can be chloride, bromide, iodide, nitrate, perchlorate, sulfonate, hexafluoroarsenate, hexafluorophosphate, p-toluenesulfonate, acetate, phosphate, or a combination thereof.

For the methods described herein, the aryl sulfonium salt can be triarylsulfonium chloride, triarylsulfonium nitrate, triarylsulfonium bromide, triarylsulfonium iodide, triarylsulfonium hexafluorophosphate, triarylsulfonium perchloroate, triarylsulfonium hexafluoroarsenate, triarylsulfonium p-toluenesulfonate, triarylsulfonium acetate, triarylsulfonium phosphate, diaryl (4-phenylthio)arylsulfonium chloride, diaryl (4-phenylthio)arylsulfonium nitrate, diaryl (4-phenylthio)arylsulfonium bromide, diaryl (4-phenylthio) arylsulfonium iodide, diaryl (4-phenylthio)arylsulfonium hexafluorophosphate, diaryl (4-phenylthio)arylsulfonium perchloroate, diaryl (4-phenylthio)arylsulfonium hexafluoroarsenate, diaryl (4-phenylthio)arylsulfonium p-toluenesulfonate, diaryl (4-phenylthio)arylsulfonium acetate, diaryl (4-phenylthio)arylsulfonium phosphate, (thiodi-4,1-phenylene)bis-diarylsulfonium dichloride, (thiodi-4,1-phenylene)bis-diarylsulfonium dichloride dinitrate, (thiodi-4,1-phenylene)bis-diarylsulfonium dichloride dibromide, (thiodi-4,1-phenylene)bis-diarylsulfonium dichloride diiodide, (thiodi-4,1-phenylene)bis-diarylsulfonium dihexafluorophosphate, (thiodi-4,1-phenylene)bis-diarylsulfonium diperchloroate, (thiodi-4,1-phenylene)bis-diarylsulfonium dihexafluoroarsenate, diaryl (thiodi-4,1-phenylene)bis-diarylsulfonium di-p-toluenesulfonate, (thiodi-4,1-phenylene) bis-diarylsulfonium diacetate, (thiodi-4,1-phenylene)bis-diarylsulfonium diphosphate, or a combination thereof.

More preferably, the aryl sulfonium salt can comprise triphenyl sulfonium chloride or alternatively, the aryl sulfonium salt can comprise diphenyl (4-phenylthio)phenylsulfonium chloride or the aryl sulfonium salt can comprise (thiodi-4,1-phenylene)bis-diphenylsulfonium dichloride.

The aryl sulfonium salts are commercially available, for example, from Sigma-Aldrich, St. Louis, Mo. Further, the aryl sulfonium salts can be prepared by multiple methods.

Methods of preparation of triarylsulfonium salts have been described in the art. For example, methods using benzene as a starting material have been disclosed. The conventional method for producing triarylsulfonium chloride salts, as described in U.S. Pat. No. 2,807,648 and depicted in Scheme 1, comprises forming a mixture comprising arene (e.g. benzene) and aluminum chloride, and then reacting the mixture with sulfur monochloride followed by a reaction with chlorine gas to produce arylsulfonium chloride salts. Depending on the reaction conditions and stoichiometric ratio of the reactants, individual salts (structures I, II, or III in Scheme 1) or mixtures thereof can be prepared using this method.

Scheme 1

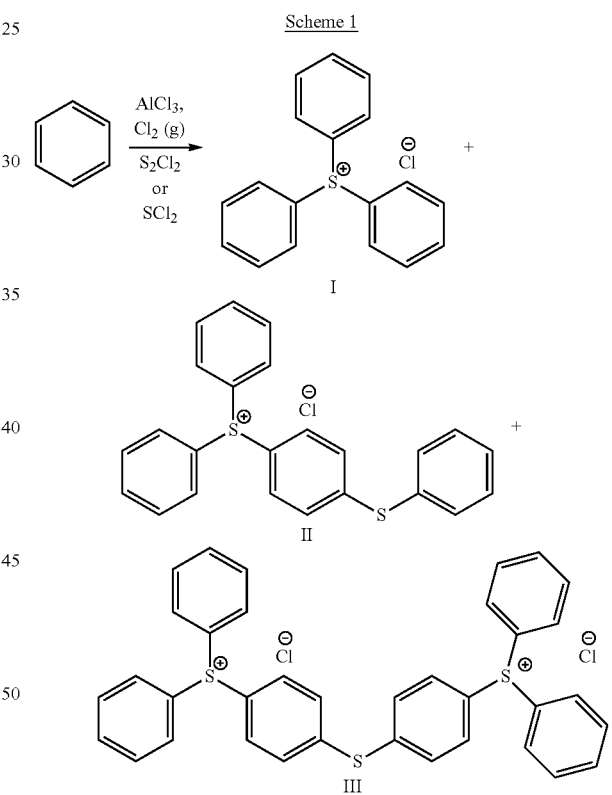

For example, diphenyl(4-(phenylthio)phenyl)sulfonium chloride (structure II in Scheme 1) can be prepared by the method described in Example 2 in U.S. Pat. No. 4,374,066, as shown in Scheme 2.

Scheme 2

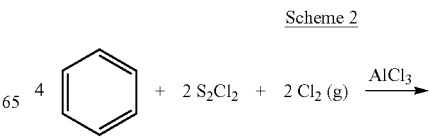

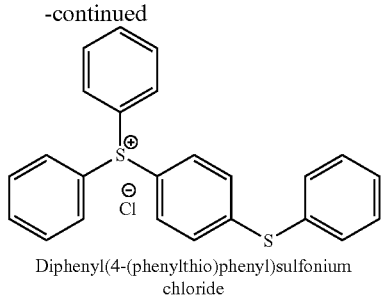

Diphenyl(4-(phenylthio)phenyl)sulfonium chloride

II

Bis-(diphenylsulfoniophenyl)-sulfide bis-chloride (structure III in Scheme 1) can also be prepared using this method, as described in detail in the comparative example of U.S. Pat. No. 4,400,541. This same method is also employed for synthesis of substituted arylsulfonium salts, as described in U.S. Patent Application No. 2005/0148679 A1.

Methods have also been taught for the synthesis of triarylsulfonium salts using diphenylsulfide as a starting material. Triarylsulfonium salts represented by structure II in Scheme 1 can be prepared through the reaction of diphenylsulfide and chlorine gas in the presence of a Friedel-Crafts catalyst (e.g. AlCl$_3$), as described in FR 2,475,078 and U.S. Pat. No. 4,374,066. The reaction proceeds as indicated in Scheme 3.

Scheme 3

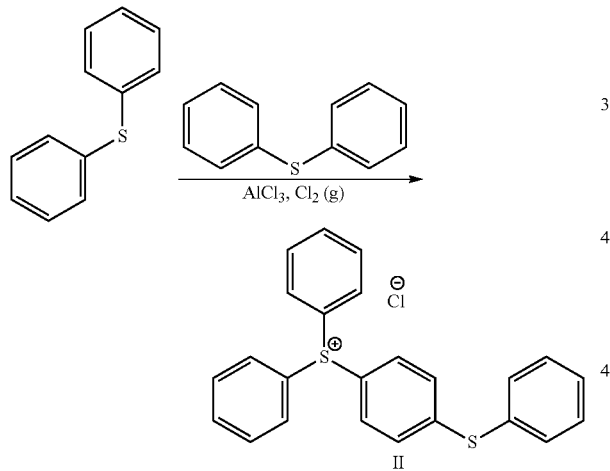

II

Methods for the synthesis of triarylsulfonium salts using diphenyldisulfide and benzene as starting materials have been described in the art. Triarylsulfonium salts represented by structure III in Scheme I can be prepared through the reaction of benzene, diphenyldisulfide (instead of diphenylsulfide), and chlorine gas in the presence of a Friedel-Crafts catalyst (e.g. AlCl$_3$), as described in U.S. Pat. No. 4,400,541 and depicted in Scheme 4.

Scheme 4

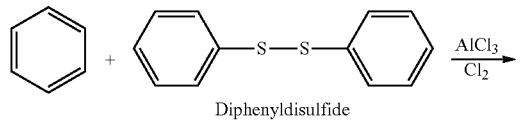

Diphenyldisulfide

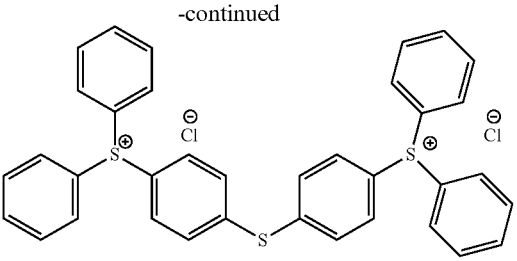

Methods have also been described in the art for the synthesis of triarylsulfonium salts using diphenylsulfide and diphenylsulfoxide as starting materials. Aryl sulfonium salts represented by structures II and III in Scheme 5 can be produced via one-pot synthesis involving condensation of diarylsulfoxides with aromatic compounds in the presence of phosphorous pentaoxide/methane sulfonic acid (MSA), as described by Akhtar, Crivello, and Lee in "Synthesis of Aryl-Substituted Sulfonium Salts by the P$_2$O$_5$-Methanesulfonic Acid Promoted Condensation of Sulfoxides with Aromatic Compounds," J. Org. Chem. 1990, vol. 55, 4222-225.

Scheme 5

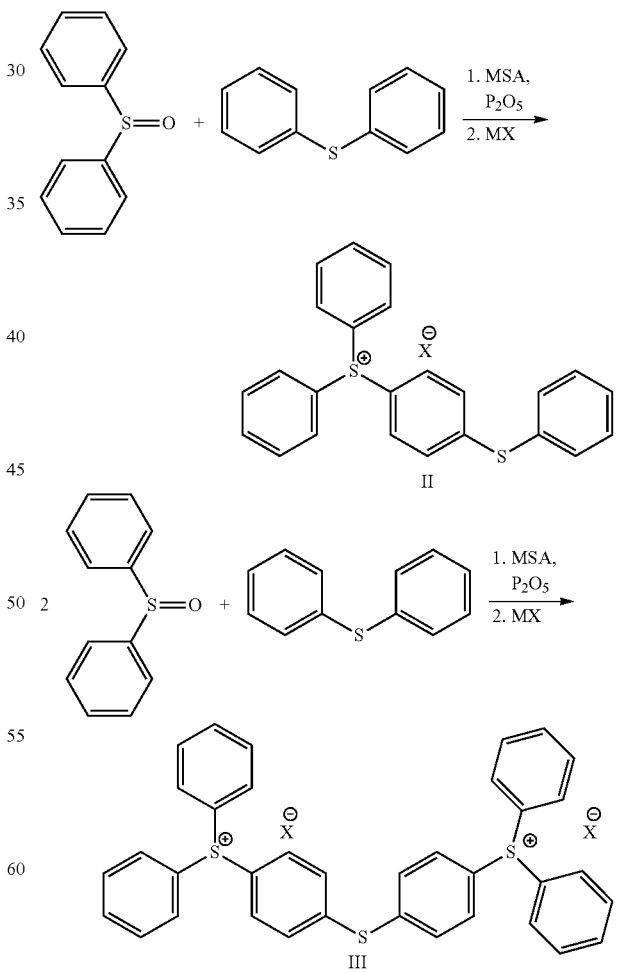

In the methods, the surface can comprise any part of a hydrocarbon-containing system comprising a water injection system, a hydrocarbon extraction system, or a hydrocarbon production system. For example, the method can comprise administering an effective amount of the aryl sulfonium salt into the water injection system, the hydrocarbon extraction system, or the hydrocarbon production system.

The water injection system, the hydrocarbon extraction system, or the hydrocarbon production system can be a subterranean hydrocarbon-containing formation, a well, a pipeline, a fluid separation vessel, a floating production storage vessel, an offloading vessel, a refinery, or a storage system.

Further, the hydrocarbon extraction or the hydrocarbon production system can be a subterranean hydrocarbon-containing formation.

In some methods, the aryl sulfonium salt can be administered by injecting an injection fluid into the hydrocarbon extraction system or the hydrocarbon production system. The injection fluid can comprise sea water, produced water, fresh water, brackish water, drilling fluid, completion fluid, or a combination thereof.

The concentration of the aryl sulfonium salt in the injection fluid can be from about 1 ppm to about 2000 ppm, from about 1 ppm to about 1500 ppm, from about 1 ppm to about 1250 ppm, from about 1 ppm to about 1000 ppm, from about 1 ppm to about 800 ppm, from about 1 ppm to about 600 ppm, from about 1 ppm to about 500 ppm, from about 5 ppm to about 2000 ppm, from about 5 ppm to about 1500 ppm, from about 5 ppm to about 1250 ppm, from about 5 ppm to about 1000 ppm, from about 5 ppm to about 800 ppm, from about 5 ppm to about 600 ppm, from about 5 ppm to about 500 ppm, based on the total amount of injection fluid injected into the formation or production system. More preferably, the effective amount of the aryl sulfonium salt is from about 5 to about 500 ppm based on the total amount of injection fluid injected into the formation or production system.

For the methods described herein, the aryl sulfonium salt can be injected into the water injection system, the hydrocarbon extraction system, or the hydrocarbon production system continuously with the injection fluid.

Further, the aryl sulfonium salt can be injected into the water injection system, the hydrocarbon extraction system, or the hydrocarbon production system intermittently with the injection fluid. When the aryl sulfonium salt is injected into the hydrocarbon extraction or production system intermittently, the injection of the aryl sulfonium salt can occur every one to four hours, one to four days, or one to four weeks.

In the methods, the hydrocarbon fluid contacting the surface can comprise natural gas or a liquid hydrocarbon. The liquid hydrocarbon can comprise crude oil, heavy oil, processed residual oil, bituminous oil, cocker oil, gas oil, fluid catalytic cracker feed or slurry, naptha, diesel fluid, fuel oil, jet fuel, gasoline or kerosene.

The compositions can be applied to a gas or liquid produced or used in a waste-water process, a farm, a slaughter house, a land-fill, a sewage collection system, a municipality waste-water plant, a coking coal process, a paper mill, or a biofuel process.

The methods herein can further comprise administering one or more of an additional corrosion inhibitor, an organic solvent, an asphaltene inhibitor, a paraffin inhibitor, a scale inhibitor, an emulsifier, a water clarifier, a dispersant, an emulsion breaker, a reverse emulsion breaker, a gas hydrate inhibitor, a biocide, a pH modifier, a surfactant, or a combination thereof.

The methods can comprise administering the additional corrosion inhibitor, and the additional corrosion inhibitor can comprise an imidazoline compound, a pyridinium compound, or a combination thereof.

The methods can comprise administering the water or the organic solvent and the organic solvent can comprise an alcohol, a hydrocarbon, a cyclic hydrocarbon, an aromatic hydrocarbon, a ketone, an ether, an alkylene glycol, a glycol ether, an amine, an amide, a nitrile, a sulfoxide, an ester or any combination thereof.

The methods can also comprise administering the organic solvent and the organic solvent can comprise methanol, ethanol, propanol, isopropanol, butanol, 2-ethylhexanol, hexanol, octanol, decanol, 2-butoxyethanol, methylene glycol, ethylene glycol, 1,2-propylene glycol, 1,3-propylene glycol, diethyleneglycol monomethyl ether, diethylene glycol monoethyl ether, ethylene glycol monobutyl ether, ethylene glycol dibutyl ether, pentane, hexane, cyclohexane, methylcyclohexane, heptane, decane, dodecane, diesel, toluene, xylene, heavy aromatic naphtha, cyclohexanone, diisobutylketone, diethyl ether, propylene carbonate, N-methylpyrrolidinone, N,N-dimethylformamide, or any combination thereof.

Further, in the methods, the anti-corrosion composition can comprise an effective amount of the aryl sulfonium salt and a component selected from the group consisting of an additional corrosion inhibitor, an organic solvent, an asphaltene inhibitor, a paraffin inhibitor, a scale inhibitor, an emulsifier, a water clarifier, a dispersant, an emulsion breaker, a reverse emulsion breaker, a gas hydrate inhibitor, a biocide, a pH modifier, a surfactant, and a combination thereof.

The anti-corrosion composition can comprise from about 1 to about 90 wt. % of an aryl sulfonium salt and from about 10 to about 80 wt. % of the component, preferably from about 50 to about 90 wt. % of one or more aryl sulfonium salts and from about 10 to about 50 wt. % of the component, and more preferably from about 65 to about 85 wt. % of one or more aryl sulfonium salts and from about 15 to about 35 wt. % of the component.

The component of the anti-corrosion composition can comprise water or an organic solvent. The composition can comprise from about 1 to 80 wt. %, from about 5 to 50 wt. %, or from about 10 to 35 wt. % of the water or the one or more organic solvents, based on total weight of the composition. The organic solvent can comprise an alcohol, a hydrocarbon, a ketone, an ether, an alkylene glycol, a glycol ether, an amide, a nitrile, a sulfoxide, an ester, or a combination thereof. Examples of suitable organic solvents include, but are not limited to, methanol, ethanol, propanol, isopropanol, butanol, 2-ethylhexanol, hexanol, octanol, decanol, 2-butoxyethanol, methylene glycol, ethylene glycol, 1,2-propylene glycol, 1,3-propylene glycol, diethyleneglycol monomethyl ether, diethylene glycol monoethyl ether, ethylene glycol monobutyl ether, ethylene glycol dibutyl ether, pentane, hexane, cyclohexane, methylcyclohexane, heptane, decane, dodecane, diesel, toluene, xylene, heavy aromatic naphtha, cyclohexanone, diisobutylketone, diethyl ether, propylene carbonate, N-methylpyrrolidinone, N,N-dimethylformamide, or a combination thereof.

The component of the anti-corrosion composition can comprise an additional corrosion inhibitor. The composition can comprise from about 0.1 to 20 wt. %, 0.1 to 10 wt. %, or 0.1 to 5 wt. % of the corrosion inhibitors, based on total weight of the composition. A composition of the invention can comprise from 0.1 to 10 percent by weight of the corrosion inhibitors, based on total weight of the composition. The composition can comprise 1.0 wt %, 1.5 wt %, 2.0 wt %, 2.5 wt %, 3.0 wt %, 3.5 wt %, 4.0 wt %, 4.5 wt %, 5.0 wt %, 5.5 wt %, 6.0 wt %, 6.5 wt %, 7.0 wt %, 7.5 wt %, 8.0 wt %, 8.5 wt %, 9.0 wt %, 9.5 wt %, 10.0 wt %, 10.5 wt %, 11.0 wt %, 11.5 wt %, 12.0 wt %, 12.5 wt %, 13.0 wt %, 13.5 wt %, 14.0 wt %, 14.5 wt %, or 15.0 wt % by weight of the corrosion inhibitors, based on total weight of the composition. Each system can have its own requirements, and the weight percent of one or more additional corrosion inhibitors in the composition can vary with the system in which it is used.

The additional corrosion inhibitor can comprise an imidazoline compound, a quaternary ammonium compound, a pyridinium compound, or a combination thereof.

The additional corrosion inhibitor component can comprise an imidazoline. The imidazoline can be, for example, imidazoline derived from a diamine, such as ethylene diamine (EDA), diethylene triamine (DETA), triethylene tetraamine (TETA) etc. and a long chain fatty acid such as tall oil fatty acid (TOFA). The imidazoline can be an imidazoline of Formula (I) or an imidazoline derivative. Representative imidazoline derivatives include an imidazolinium compound of Formula (II) or a bis-quaternized compound of Formula (III).

The additional corrosion inhibitor component can include an imidazoline of Formula (I):

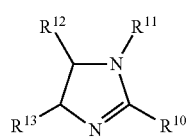

wherein $R^{10}$ is a $C_1$-$C_{20}$ alkyl or a $C_1$-$C_{20}$ alkoxyalkyl group; $R^{11}$ is hydrogen, $C_1$-$C_6$ alkyl, $C_1$-$C_6$ hydroxyalkyl, or $C_1$-$C_6$ arylalkyl; and $R^{12}$ and $R^{13}$ are independently hydrogen or a $C_1$-$C_6$ alkyl group. Preferably, the imidazoline includes an $R^{10}$ which is the alkyl mixture typical in tall oil fatty acid (TOFA), and $R^{11}$, $R^{12}$ and $R^{13}$ are each hydrogen.

The additional corrosion inhibitor component can include an imidazolinium compound of Formula (II):

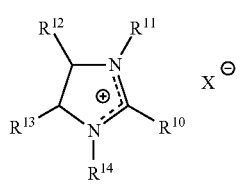

wherein $R^{10}$ is a $C_1$-$C_{20}$ alkyl or a $C_1$-$C_{20}$ alkoxyalkyl group; $R^{11}$ and $R^{14}$ are independently hydrogen, $C_1$-$C_6$ alkyl, $C_1$-$C_6$ hydroxyalkyl, or $C_1$-$C_6$ arylalkyl; $R^{12}$ and $R^{13}$ are independently hydrogen or a $C_1$-$C_6$ alkyl group; and $X^-$ is a halide (such as chloride, bromide, or iodide), carbonate, sulfonate, phosphate, or the anion of an organic carboxylic acid (such as acetate). Preferably, the imidazolinium compound includes 1-benzyl-1-(2-hydroxyethyl)-2-tall-oil-2-imidazolinium chloride.

The additional corrosion inhibitor can comprise a bis-quaternized compound having the formula (III):

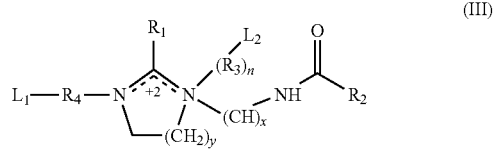

wherein $R_1$ and $R_2$ are each independently unsubstituted branched, chain or ring alkyl or alkenyl having from 1 to about 29 carbon atoms; partially or fully oxygenized, sulfurized, and/or phosphorylized branched, chain, or ring alkyl or alkenyl having from 1 to about 29 carbon atoms; or a combination thereof; $R_3$ and $R_4$ are each independently unsubstituted branched, chain or ring alkylene or alkenylene having from 1 to about 29 carbon atoms; partially or fully oxygenized, sulfurized, and/or phosphorylized branched, chain, or ring alkylene or alkenylene having from 1 to about 29 carbon atoms; or a combination thereof; $L_1$ and $L_2$ are each independently absent, H, —COOH, —SO$_3$H, —PO$_3$H$_2$, —COOR$_5$, —CONH$_2$, —CONHR$_5$, or —CON(R$_5$)$_2$; $R_5$ is each independently a branched or unbranched alkyl, aryl, alkylaryl, alkylheteroaryl, cycloalkyl, or heteroaryl group having from 1 to about 10 carbon atoms; n is 0 or 1, and when n is 0, $L_2$ is absent or H; x is from 1 to about 10; and y is from 1 to about 5. Preferably, $R_1$ and $R_2$ are each independently $C_6$-$C_{22}$ alkyl, $C_8$-$C_{20}$ alkyl, $C_{12}$-$C_{18}$ alkyl, $C_{16}$-$C_{18}$ alkyl, or a combination thereof; $R_3$ and $R_4$ are $C_1$-$C_{10}$ alkylene, $C_2$-$C_8$ alkylene, $C_2$-$C_6$ alkylene, or $C_2$-$C_3$ alkylene; n is 0 or 1; x is 2; y is 1; $R_3$ and $R_4$ are —C$_2$H$_2$—; $L_1$ is —COOH, —SO$_3$H, or —PO$_3$H$_2$; and $L_2$ is absent, H, —COOH, —SO$_3$H, or —PO$_3$H$_2$. For example, $R_1$ and $R_2$ can be derived from a mixture of tall oil fatty acids and are predominantly a mixture of $C_{17}H_{33}$ and $C_{17}H_{31}$ or can be $C_{16}$-$C_{18}$ alkyl; $R_3$ and $R_4$ can be $C_2$-$C_3$ alkylene such as —C$_2$H$_2$—; n is 1 and $L_2$ is —COOH or n is 0 and $L_2$ is absent or H; x is 2; y is 1; $R_3$ and $R_4$ are —C$_2$H$_2$—; and $L_1$ is —COOH.

It should be appreciated that the number of carbon atoms specified for each group of formula (III) refers to the main chain of carbon atoms and does not include carbon atoms that may be contributed by substituents.

The additional corrosion inhibitor can comprise a bis-quaternized imidazoline compound having the formula (III) wherein $R_1$ and $R_2$ are each independently $C_6$-$C_{22}$ alkyl, $C_8$-$C_{20}$ alkyl, $C_{12}$-$C_{18}$ alkyl, or $C_{16}$-$C_{18}$ alkyl or a combination thereof; $R_4$ is $C_1$-$C_{10}$ alkylene, $C_2$-$C_8$ alkylene, $C_2$-$C_6$ alkylene, or $C_2$-$C_3$ alkylene; x is 2; y is 1; n is 0; $L_1$ is —COOH, —SO$_3$H, or —PO$_3$H$_2$; and $L_2$ is absent or H. Preferably, a bis-quaternized compound has the formula (III) wherein $R_1$ and $R_2$ are each independently $C_{16}$-$C_{18}$ alkyl; $R_4$ is —C$_2$H$_2$—; x is 2; y is 1; n is 0; $L_1$ is —COOH, —SO$_3$H, or —PO$_3$H$_2$ and $L_2$ is absent or H.

The additional corrosion inhibitor can be a quaternary ammonium compound of Formula (IV):

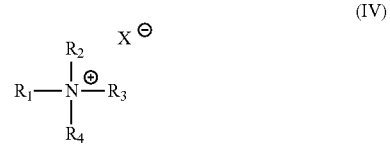

wherein $R_1$, $R_2$, and $R_3$ are independently $C_1$ to $C_{20}$ alkyl, $R_4$ is methyl or benzyl, and $X^-$ is a halide or methosulfate.

Suitable alkyl, hydroxyalkyl, alkylaryl, arylalkyl or aryl amine quaternary salts include those alkylaryl, arylalkyl and aryl amine quaternary salts of the formula [N⁺R⁵ᵃR⁶ᵃR⁷ᵃR⁸ᵃ][X⁻] wherein R⁵ᵃ, R⁶ᵃ, R⁷ᵃ, and R⁸ᵃ contain one to 18 carbon atoms, and X is Cl, Br or I. For the quaternary salts, R⁵ᵃ, R⁶ᵃ, R⁷ᵃ, and R⁸ᵃ can each be independently selected from the group consisting of alkyl (e.g., $C_1$-$C_{18}$ alkyl), hydroxyalkyl (e.g., $C_1$-$C_{18}$ hydroxyalkyl), and arylalkyl (e.g., benzyl). The mono or polycyclic aromatic amine salt with an alkyl or alkylaryl halide include salts of the formula [N⁺R⁵ᵃR⁶ᵃR⁷ᵃR⁸ᵃ][X⁻] wherein R⁵ᵃ, R⁶ᵃ, R⁷ᵃ, and R⁸ᵃ contain one to 18 carbon atoms and at least one aryl group, and X is Cl, Br or I.

Suitable quaternary ammonium salts include, but are not limited to, a tetramethyl ammonium salt, a tetraethyl ammonium salt, a tetrapropyl ammonium salt, a tetrabutyl ammonium salt, a tetrahexyl ammonium salt, a tetraoctyl ammonium salt, a benzyltrimethyl ammonium salt, a benzyltriethyl ammonium salt, a phenyltrimethyl ammonium salt, a phenyltriethyl ammonium salt, a cetyl benzyldimethyl ammonium salt, a hexadecyl trimethyl ammonium salt, a dimethyl alkyl benzyl quaternary ammonium salt, a monomethyl dialkyl benzyl quaternary ammonium salt, or a trialkyl benzyl quaternary ammonium salt, wherein the alkyl group has about 6 to about 24 carbon atoms, about 10 and about 18 carbon atoms, or about 12 to about 16 carbon atoms. The quaternary ammonium salt can be a benzyl trialkyl quaternary ammonium salt, a benzyl triethanolamine quaternary ammonium salt, or a benzyl dimethylaminoethanolamine quaternary ammonium salt.

The additional corrosion inhibitor component can comprise a pyridinium salt such as those represented by Formula (V):

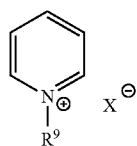

(V)

wherein R⁹ is an alkyl group, an aryl group, or an arylalkyl group, wherein said alkyl groups have from 1 to about 18 carbon atoms and X⁻ is a halide such as chloride, bromide, or iodide. Among these compounds are alkyl pyridinium salts and alkyl pyridinium benzyl quats. Exemplary compounds include methyl pyridinium chloride, ethyl pyridinium chloride, propyl pyridinium chloride, butyl pyridinium chloride, octyl pyridinium chloride, decyl pyridinium chloride, lauryl pyridinium chloride, cetyl pyridinium chloride, benzyl pyridinium chloride and an alkyl benzyl pyridinium chloride, preferably wherein the alkyl is a $C_1$-$C_6$ hydrocarbyl group. Preferably, the pyridinium compound includes benzyl pyridinium chloride.

The additional corrosion inhibitor components can also include phosphate esters, monomeric or oligomeric fatty acids, or alkoxylated amines.

The additional corrosion inhibitor component can comprise a phosphate ester. Suitable mono-, di- and tri-alkyl as well as alkylaryl phosphate esters and phosphate esters of mono, di, and triethanolamine typically contain between from 1 to about 18 carbon atoms. Preferred mono-, di- and trialkyl phosphate esters, alkylaryl or arylalkyl phosphate esters are those prepared by reacting a $C_3$-$C_{18}$ aliphatic alcohol with phosphorous pentoxide. The phosphate intermediate interchanges its ester groups with triethylphosphate producing a more broad distribution of alkyl phosphate esters.

Alternatively, the phosphate ester can be made by admixing with an alkyl diester, a mixture of low molecular weight alkyl alcohols or diols. The low molecular weight alkyl alcohols or diols preferably include $C_6$ to $C_{10}$ alcohols or diols. Further, phosphate esters of polyols and their salts containing one or more 2-hydroxyethyl groups, and hydroxylamine phosphate esters obtained by reacting polyphosphoric acid or phosphorus pentoxide with hydroxylamines such as diethanolamine or triethanolamine are preferred.

The additional corrosion inhibitor component can include a monomeric or oligomeric fatty acid. Preferred monomeric or oligomeric fatty acids are $C_{14}$-$C_{22}$ saturated and unsaturated fatty acids as well as dimer, trimer and oligomer products obtained by polymerizing one or more of such fatty acids.

The additional corrosion inhibitor component can comprise an alkoxylated amine. The alkoxylated amine can be an ethoxylated alkyl amine. The alkoxylated amine can be ethoxylated tallow amine.

The component of the composition can comprise an organic sulfur compound, such as a mercaptoalkyl alcohol, mercaptoacetic acid, thioglycolic acid, 3,3'-dithiodipropionic acid, sodium thiosulfate, thiourea, L-cysteine, tert-butyl mercaptan, sodium thiosulfate, ammonium thiosulfate, sodium thiocyanate, ammonium thiocyanate, sodium metabisulfite, or a combination thereof. Preferably, the mercaptoalkyl alcohol comprises 2-mercaptoethanol. The organic sulfur compound can constitute 0.5 to 15 wt. % of the composition, based on total weight of the composition, preferably about 1 to about 10 wt. % and more preferably about 1 to about 5 wt. %. The organic sulfur compound can constitute 1, 2, 3, 4, 5, 6, 7, 8, 9, 10, 11, 12, 13, 14 or 15 wt. % of the composition.

The composition can be substantially free of or free of any organic sulfur compound other than the compound of formula (1). A composition is substantially free of any organic sulfur compound if it contains an amount of organic sulfur compound below the amount that will produce hydrogen sulfide gas upon storage at a temperature of 25° C. and ambient pressure.

The composition can comprise a demulsifier. Preferably, the demulsifier comprises an oxyalkylate polymer, such as a polyalkylene glycol. The demulsifier can constitute from about 0.1 to 10 wt. %, from about 0.5 to 5 wt. %, or from about 0.5 to 4 wt. % of the composition, based on total weight of the composition. The demulsifier can constitute 0.5, 1, 1.5, 2, 2.5, 3, 3.5, 4, 4.5 or 5 wt. % of the composition.

The composition can include an asphaltene inhibitor. The composition can comprise from about 0.1 to 10 wt. %, from about 0.1 to 5 wt. %, or from about 0.5 to 4 wt. % of an asphaltene inhibitor, based on total weight of the composition. Suitable asphaltene inhibitors include, but are not limited to, aliphatic sulfonic acids; alkyl aryl sulfonic acids; aryl sulfonates; lignosulfonates; alkylphenol/aldehyde resins and similar sulfonated resins; polyolefin esters; polyolefin imides; polyolefin esters with alkyl, alkylenephenyl or alkylenepyridyl functional groups; polyolefin amides; polyolefin amides with alkyl, alkylenephenyl or alkylenepyridyl functional groups; polyolefin imides with alkyl, alkylenephenyl or alkylenepyridyl functional groups; alkenyl/vinyl pyrrolidone copolymers; graft polymers of polyolefins with maleic anhydride or vinyl imidazole; hyperbranched polyester amides; polyalkoxylated asphaltenes, amphoteric fatty acids, salts of alkyl succinates, sorbitan monooleate, and polyisobutylene succinic anhydride.

The composition can include an additional paraffin inhibitor. The composition can comprise from about 0.1 to 10 wt. %, from about 0.1 to 5 wt. %, or from about 0.5 to 4 wt. % of an additional paraffin inhibitor, based on total weight of the composition. Suitable additional paraffin inhibitors include, but are not limited to, paraffin crystal modifiers, and dispersant/crystal modifier combinations. Suitable paraffin crystal modifiers include, but are not limited to, alkyl acrylate copolymers, alkyl acrylate vinylpyridine copolymers, ethylene vinyl acetate copolymers, maleic anhydride ester copolymers, branched polyethylenes, naphthalene, anthracene, microcrystalline wax and/or asphaltenes. Suitable paraffin dispersants include, but are not limited to, dodecyl benzene sulfonate, oxyalkylated alkylphenols, and oxyalkylated alkylphenolic resins.

The composition can include a scale inhibitor. The composition can comprise from about 0.1 to 20 wt. %, from about 0.5 to 10 wt. %, or from about 1 to 10 wt. % of a scale inhibitor, based on total weight of the composition. Suitable scale inhibitors include, but are not limited to, phosphates, phosphate esters, phosphoric acids, phosphonates, phosphonic acids, polyacrylam ides, salts of acrylamidomethyl propane sulfonate/acrylic acid copolymer (AMPS/AA), phosphinated maleic copolymer (PHOS/MA), and salts of a polymaleic acid/acrylic acid/acrylamidomethyl propane sulfonate terpolymer (PMA/AA/AMPS).

The composition can include an emulsifier. The composition can comprise from about 0.1 to 10 wt. %, from about 0.5 to 5 wt. %, or from about 0.5 to 4 wt. % of an emulsifier, based on total weight of the composition. Suitable emulsifiers include, but are not limited to, salts of carboxylic acids, products of acylation reactions between carboxylic acids or carboxylic anhydrides and amines, and alkyl, acyl and amide derivatives of saccharides (alkyl-saccharide emulsifiers).

The composition can include a water clarifier. The composition can comprise from about 0.1 to 10 wt. %, from about 0.5 to 5 wt. %, or from about 0.5 to 4 wt. % of a water clarifier, based on total weight of the composition. Suitable water clarifiers include, but are not limited to, inorganic metal salts such as alum, aluminum chloride, and aluminum chlorohydrate, or organic polymers such as acrylic acid based polymers, acrylamide based polymers, polymerized amines, alkanolamines, thiocarbamates, and cationic polymers such as diallyldimethylammonium chloride (DADMAC).

The composition can include a dispersant. The composition can comprise from about 0.1 to 10 wt. %, from about 0.5 to 5 wt. %, or from about 0.5 to 4 wt. % of a dispersant, based on total weight of the composition. Suitable dispersants include, but are not limited to, aliphatic phosphonic acids with 2-50 carbons, such as hydroxyethyl diphosphonic acid, and aminoalkyl phosphonic acids, e.g. polyaminomethylene phosphonates with 2-10 N atoms e.g. each bearing at least one methylene phosphonic acid group; examples of the latter are ethylenediamine tetra(methylene phosphonate), diethylenetriamine penta(methylene phosphonate), and the triamine- and tetramine-polymethylene phosphonates with 2-4 methylene groups between each N atom, at least 2 of the numbers of methylene groups in each phosphonate being different. Other suitable dispersion agents include lignin, or derivatives of lignin such as lignosulfonate and naphthalene sulfonic acid and derivatives.

The composition can include an emulsion breaker. The composition can comprise from about 0.1 to 10 wt. %, from about 0.5 to 5 wt. %, or from about 0.5 to 4 wt. % of an emulsion breaker, based on total weight of the composition. Suitable emulsion breakers include, but are not limited to, dodecylbenzylsulfonic acid (DDBSA), the sodium salt of xylenesulfonic acid (NAXSA), epoxylated and propoxylated compounds, anionic, cationic and nonionic surfactants, and resins, such as phenolic and epoxide resins.

The composition can include a hydrogen sulfide scavenger. The composition can comprise from about 1 to 50 wt. %, from about 1 to 40 wt. %, or from about 1 to 30 wt. % of a hydrogen sulfide scavenger, based on total weight of the composition. Suitable additional hydrogen sulfide scavengers include, but are not limited to, oxidants (e.g., inorganic peroxides such as sodium peroxide or chlorine dioxide); aldehydes (e.g., of 1-10 carbons such as formaldehyde, glyoxal, glutaraldehyde, acrolein, or methacrolein; triazines (e.g., monoethanolamine triazine, monomethylamine triazine, and triazines from multiple amines or mixtures thereof); condensation products of secondary or tertiary amines and aldehydes, and condensation products of alkyl alcohols and aldehydes.

The composition can include a gas hydrate inhibitor. The composition can comprise from about 0.1 to 25 wt. %, from about 0.1 to 20 wt. %, or from about 0.3 to 20 wt. % of a gas hydrate inhibitor, based on total weight of the composition. Suitable gas hydrate inhibitors include, but are not limited to, thermodynamic hydrate inhibitors (THI), kinetic hydrate inhibitors (KHI), and anti-agglomerates (AA). Suitable thermodynamic hydrate inhibitors include, but are not limited to, sodium chloride, potassium chloride, calcium chloride, magnesium chloride, sodium bromide, formate brines (e.g. potassium formate), polyols (such as glucose, sucrose, fructose, maltose, lactose, gluconate, monoethylene glycol, diethylene glycol, triethylene glycol, mono-propylene glycol, dipropylene glycol, tripropylene glycols, tetrapropylene glycol, monobutylene glycol, dibutylene glycol, tributylene glycol, glycerol, diglycerol, triglycerol, and sugar alcohols (e.g. sorbitol, mannitol)), methanol, propanol, ethanol, glycol ethers (such as diethyleneglycol monomethylether, ethyleneglycol monobutylether), and alkyl or cyclic esters of alcohols (such as ethyl lactate, butyl lactate, methylethyl benzoate).

The composition can include a kinetic hydrate inhibitor. The composition can comprise from about 5 to 30 wt. %, from about 5 to 25 wt. %, or from about 10 to 25 wt. % of a kinetic hydrate inhibitor, based on total weight of the composition. Suitable kinetic hydrate inhibitors and anti-agglomerates include, but are not limited to, polymers and copolymers, polysaccharides (such as hydroxyethylcellulose (HEC), carboxymethylcellulose (CMC), starch, starch derivatives, and xanthan), lactams (such as polyvinylcaprolactam, polyvinyl lactam), pyrrolidones (such as polyvinyl pyrrolidone of various molecular weights), surfactants (such as fatty acid salts, ethoxylated alcohols, propoxylated alcohols, sorbitan esters, ethoxylated sorbitan esters, polyglycerol esters of fatty acids, alkyl glucosides, alkyl polyglucosides, alkyl sulfates, alkyl sulfonates, alkyl ester sulfonates, alkyl aromatic sulfonates, alkyl betaine, alkyl amido betaines), hydrocarbon based dispersants (such as lignosulfonates, iminodisuccinates, polyaspartates), amino acids, and proteins.

The composition can include a biocide. The composition can comprise from about 0.1 to 10 wt. %, from about 0.5 to 5 wt. %, or from about 0.5 to 4 wt. % of a biocide, based on total weight of the composition. Suitable biocides include, but are not limited to, oxidizing and non-oxidizing biocides. Suitable non-oxidizing biocides include, for example, aldehydes (e.g., formaldehyde, glutaraldehyde, and acrolein), amine-type compounds (e.g., quaternary amine compounds and cocodiamine), halogenated compounds (e.g., 2-bromo-2-nitropropane-3-diol (Bronopol) and 2-2-dibromo-3-nitrilopropionamide (DBNPA)), sulfur compounds (e.g., isothiazolone, carbamates, and metronidazole), and quaternary phosphonium salts (e.g., tetrakis(hydroxymethyl)-phosphonium sulfate (THPS)). Suitable oxidizing biocides include, for example, sodium hypochlorite, trichloroisocyanuric acids, dichloroisocyanuric acid, calcium hypochlorite, lithium hypochlorite, chlorinated hydantoins, stabilized sodium hypobromite, activated sodium bromide, brominated hydantoins, chlorine dioxide, ozone, and peroxides.

The composition can include a pH modifier. The composition can comprise from about 0.1 to 20 wt. %, from about 0.5 to 10 wt. %, or from about 0.5 to 5 wt. % of a pH modifier, based on total weight of the composition. Suitable pH modifiers include, but are not limited to, alkali hydroxides, alkali carbonates, alkali bicarbonates, alkaline earth metal hydroxides, alkaline earth metal carbonates, alkaline earth metal bicarbonates and mixtures or combinations thereof. Exemplary pH modifiers include sodium hydroxide, potassium hydroxide, calcium hydroxide, calcium oxide, sodium carbonate, potassium carbonate, sodium bicarbonate, potassium bicarbonate, magnesium oxide, and magnesium hydroxide.

The composition can include a surfactant. The composition can comprise from about 0.1 to 10 wt. %, from about 0.5 to 5 wt. %, or from about 0.5 to 4 wt. % of a surfactant, based on total weight of the composition. Suitable surfactants include, but are not limited to, anionic surfactants and nonionic surfactants. Anionic surfactants include alkyl aryl sulfonates, olefin sulfonates, paraffin sulfonates, alcohol sulfates, alcohol ether sulfates, alkyl carboxylates and alkyl ether carboxylates, and alkyl and ethoxylated alkyl phosphate esters, and mono and dialkyl sulfosuccinates and sulfosuccinamates. Nonionic surfactants include alcohol alkoxylates, alkylphenol alkoxylates, block copolymers of ethylene, propylene and butylene oxides, alkyl dimethyl amine oxides, alkyl-bis(2-hydroxyethyl) amine oxides, alkyl amidopropyl dimethyl amine oxides, alkylamidopropyl-bis (2-hydroxyethyl) amine oxides, alkyl polyglucosides, polyalkoxylated glycerides, sorbitan esters and polyalkoxylated sorbitan esters, and alkoyl polyethylene glycol esters and diesters. Also included are betaines and sultanes, amphoteric surfactants such as alkyl amphoacetates and amphodiacetates, alkyl amphopropionates and amphodipropionates, and alkyliminodipropionate.

Anti-corrosion compositions made according to the invention can further include additional functional agents or additives that provide a beneficial property. For example, additional agents or additives can be sequestrants, solubilizers, lubricants, buffers, cleaning agents, rinse aids, preservatives, binders, thickeners or other viscosity modifiers, processing aids, carriers, water-conditioning agents, foam inhibitors or foam generators, threshold agents or systems, aesthetic enhancing agents (i.e., dyes, odorants, perfumes), or other additives suitable for formulation with a corrosion inhibitor composition, and mixtures thereof. Additional agents or additives will vary according to the particular corrosion inhibitor composition being manufactured and its intend use as one skilled in the art will appreciate.

Alternatively, the compositions can not contain any of the additional agents or additives.

Additionally, the aryl sulfonium salt can be formulated into a treatment fluid comprising the following components. These formulations include the ranges of the components listed and can optionally include additional agents.

| Component | 1 | 2 | 3 | 4 | 5 | 6 | 7 | 8 | 9 | 10 | 11 | 12 |
|---|---|---|---|---|---|---|---|---|---|---|---|---|
| Aryl sulfonium salt (wt. %) | 1-90 | 1-90 | 1-90 | 1-90 | 1-90 | 1-90 | 15-85 | 15-85 | 15-85 | 15-85 | 15-85 | 1-90 |
| Organic solvent (wt. %) | 10-35 | | | | | | 10-35 | | | | | 10-35 |
| Corrosion inhibitor (wt. %) | 0.1-20 | 0.1-20 | | | | | 0.1-20 | 0.1-20 | | | | 0.1-20 |
| Asphaltene inhibitor (wt. %) | 0.1-5 | 0.1-5 | 0.1-5 | 0.1-5 | | | 0.1-5 | 0.1-5 | 0.1-5 | | | 0.1-5 |
| Paraffin inhibitor (wt. %) | | | | | | | | | | | | |
| Scale inhibitor (wt. %) | 1-10 | 1-10 | 1-10 | 1-10 | 1-10 | | 1-10 | 1-10 | 1-10 | 1-10 | | 1-10 |
| Emulsifier (wt. %) | | | | | | | | | | | | |
| Water clarifier (wt. %) | | | | | | | | | | | | |
| Dispersant (wt. %) | | | | | | | | | | | | |
| Emulsion breaker (wt. %) | | | | | | | | | | | | |
| Gas hydrate inhibitor (wt. %) | | | | | | | | | | | | 0.1-25 |
| Biocide (wt. %) | 0.5-5 | 0.5-5 | 0.5-5 | 0.5-5 | 0.5-5 | 0.5-5 | 0.5-5 | 0.5-5 | 0.5-5 | 0.5-5 | 0.5-5 | |

| Component | 13 | 14 | 15 | 16 | 17 | 18 | 19 | 20 | 21 | 22 | 23 | 24 |
|---|---|---|---|---|---|---|---|---|---|---|---|---|
| Aryl sulfonium salt (wt. %) | 1-90 | 1-90 | 1-90 | 1-90 | 1-90 | 1-90 | 15-85 | 15-85 | 15-85 | 15-85 | 15-85 | 15-85 |
| Organic solvent (wt. %) | | | | | | | | | | | | |
| Corrosion inhibitor (wt. %) | 0.1-20 | 0.1-20 | 0.1-20 | 0.1-20 | 0.1-20 | 0.1-20 | 0.1-20 | 0.1-20 | 0.1-20 | 0.1-20 | 0.1-20 | 0.1-20 |
| Asphaltene inhibitor (wt. %) | 0.1-5 | | | | | | 0.1-5 | | | | | |
| Paraffin inhibitor (wt. %) | | | | | | | | | | | | |

-continued

| | | | | | | | | | |
|---|---|---|---|---|---|---|---|---|---|
| Scale inhibitor (wt. %) | 1-10 | 1-10 | | 1-10 | | 1-10 | 1-10 | | 1-10 |
| Emulsifier (wt. %) | | | | | | | | | |
| Water clarifier (wt. %) | | | | | | | | | |
| Dispersant (wt. %) | | | | | | | | | |
| Emulsion breaker (wt. %) | | | | | | | | | |
| Gas hydrate inhibitor (wt. %) | 0.1-25 | 0.1-25 | 0.1-25 | | | 0.1-25 | 0.1-25 | 0.1-25 | 0.1-25 |
| Biocide (wt. %) | | | | | 0.5-5 | 0.5-5 | 0.5-5 | 0.5-5 | 0.5-5 |

Definitions

Unless otherwise indicated, an alkyl group as described herein alone or as part of another group is an optionally substituted linear saturated monovalent hydrocarbon substituent containing from one to sixty carbon atoms and preferably one to thirty carbon atoms in the main chain or eight to thirty carbon atoms in the main chain, or an optionally substituted branched saturated monovalent hydrocarbon substituent containing three to sixty carbon atoms, and preferably eight to thirty carbon atoms in the main chain. Examples of unsubstituted alkyl groups include methyl, ethyl, n-propyl, i-propyl, n-butyl, i-butyl, s-butyl, t-butyl, n-pentyl, i-pentyl, s-pentyl, t-pentyl, and the like.

The term alkoxy as used herein or alone or as part of another group is an —OR group, wherein the R group is a substitued or unsubstituted alkyl group as defined herein.

The terms "aryl" or "ar" as used herein alone or as part of another group (e.g., aralkyl) denote optionally substituted homocyclic aromatic groups, preferably monocyclic or bicyclic groups containing from 6 to 12 carbons in the ring portion, such as phenyl, biphenyl, naphthyl, substituted phenyl, substituted biphenyl or substituted naphthyl. Phenyl and substituted phenyl are the more preferred aryl. The term "aryl" also includes heteroaryl.

The term "substituted" as in "substituted aryl," "substituted alkyl," and the like, means that in the group in question (i.e., the alkyl, aryl or other group that follows the term), at least one hydrogen atom bound to a carbon atom is replaced with one or more substituent groups such as hydroxy (—OH), alkylthio, phosphino, amido (—CON($R_A$)($R_B$), wherein $R_A$ and $R_B$ are independently hydrogen, alkyl, or aryl), amino(—N($R_A$)($R_B$), wherein $R_A$ and $R_B$ are independently hydrogen, alkyl, or aryl), halo (fluoro, chloro, bromo, or iodo), silyl, nitro (—$NO_2$), an ether (—$OR_A$ wherein $R_A$ is alkyl or aryl), an ester (—OC(O)$R_A$ wherein $R_A$ is alkyl or aryl), keto (—C(O)$R_A$ wherein $R_A$ is alkyl or aryl), heterocyclo, and the like. When the term "substituted" introduces a list of possible substituted groups, it is intended that the term apply to every member of that group. That is, the phrase "optionally substituted alkyl or aryl" is to be interpreted as "optionally substituted alkyl or optionally substituted aryl."

The term "heterocyclo," "heterocycle," or "heterocyclyl," as used herein, refers to a monocyclic, bicyclic, or tricyclic group containing 1 to 4 heteroatoms selected from N, O, S(O)$_n$, P(O)$_n$, $PR^z$, NH or $NR^z$, wherein $R^z$ is a suitable substituent. Heterocyclic groups optionally contain one or two double bonds. Heterocyclic groups include, but are not limited to, azetidinyl, tetrahydrofuranyl, imidazolidinyl, pyrrolidinyl, piperidinyl, piperazinyl, oxazolidinyl, thiazolidinyl, pyrazolidinyl, thiomorpholinyl, tetrahydrothiazinyl, tetrahydro-thiadiazinyl, morpholinyl, oxetanyl, tetrahydrodiazinyl, oxazinyl, oxathiazinyl, indolinyl, isoindolinyl, quinuclidinyl, chromanyl, isochromanyl, and benzoxazinyl. Examples of monocyclic saturated or partially saturated ring systems are tetrahydrofuran-2-yl, tetrahydrofuran-3-yl, imidazolidin-1-yl, imidazolidin-2-yl, imidazolidin-4-yl, pyrrolidin-1-yl, pyrrolidin-2-yl, pyrrolidin-3-yl, piperidin-1-yl, piperidin-2-yl, piperidin-3-yl, piperazin-1-yl, piperazin-2-yl, piperazin-3-yl, 1,3-oxazolidin-3-yl, isothiazolidine, 1,3-thiazolidin-3-yl, 1,2-pyrazolidin-2-yl, 1,3-pyrazolidin-1-yl, thiomorpholin-yl, 1,2-tetrahydrothiazin-2-yl, 1,3-tetrahydrothiazin-3-yl, tetrahydrothiadiazin-yl, morpholin-yl, 1,2-tetrahydrodiazin-2-yl, 1,3-tetrahydrodiazin-1-yl, 1,4-oxazin-2-yl, and 1,2,5-oxathiazin-4-yl. Heterocyclic groups can be unsubstituted or substituted by one or more suitable substituents, preferably 1 to 3 suitable substituents, as defined above.

The term "microbiologically induced corrosion" is any corrosion caused directly or indirectly by contact with a microbe, a biofilm, or any product produced by a microbe or a biofilm. "Microbiologically induced corrosion" can also be caused by biofouling (or the excessive accumulation of free-floating microbes) in a fluid.

The term "microbe" herein is any microscopic organism. The microbe can be a prokaryote or a eukaryote. Generally, the microbe will be a prokaryote (e.g., eubacteria or archaebacteria).

The term "biofilm" refers to a group of microorganisms characterized by cells that stick to each other and also to a surface. The adherent cells become embedded within a slimy extracellular matrix comprising an "extracellular polymeric substance" (EPS).

Having described the invention in detail, it will be apparent that modifications and variations are possible without departing from the scope of the invention defined in the appended claims.

EXAMPLES

The following non-limiting examples are provided to further illustrate the present invention.

Example 1

Synthesis of 4,4'-bis-(diphenyl sulfonio phenyl) sulfide bis-chloride

To proceed with synthesis of 4,4'-bis-(diphenyl sulfonio phenyl) sulfide bis-chloride, benzene (230 g) and anhydrous aluminum chloride (80 g) are added into a jacketed reactor equipped with mechanical mixer, chlorine gas inlet, gas vent (with scrubber) and temperature probe. The mixture is stirred to obtain clear solution and cooled to about 10° C. Sulfur monochloride (50 g) is added next, keeping the reaction temperature at 10°-18° C. The reaction mixture is stirred for one hour at 10°-18° C. Next dry chlorine (100 g) is sparged into reactor. After completion the reaction mixture is poured onto ice (300 g) and stirred until the aluminum chloride is completely dissolved. The solution is heated to 60° C. and is allowed to stand. The product layer is drained. The product layer is extracted with an aqueous sulfuric acid solution (25 g of $H_2SO_4$ in 300 g water), the mixture is settled and the lower product layer is separated. The product layer is extracted next with an aqueous solution of sodium hydroxide (20 g of 50% NaOH in 96 ml water). Aqueous solution of the product is used as is.

Example 2

Synthesis of diphenyl(4-(phenylthio)phenyl)sulfonium chloride

To proceed with synthesis of diphenyl(4-(phenylthio) phenyl) sulfonium chloride, diphenylsulfide (37.2 g) and anhydrous aluminum chloride (13.3 g) are added into a jacketed reactor equipped with mechanical mixer, chlorine gas inlet, gas vent (with scrubber) and temperature probe. The mixture is stirred to obtain clear solution and cooled to about 10° C. Next dry chlorine (10 g) is sparged into reactor keeping the reaction temperature at 10°-18° C. After completion the reaction mixture is poured onto ice (100 g) and stirred until the aluminum chloride is completely dissolved. The solution is heated to 40° C. and is allowed to stand. The product layer is drained. The product layer is extracted with an aqueous sulfuric acid solution (5 g of $H_2SO_4$ in 100 g water), the mixture is settled and the lower product layer is separated. The product layer is extracted next with an aqueous solution of sodium hydroxide (5 g of 50% NaOH in 50 ml water). Aqueous solution of the product is used as is.

Example 3

Sulfonium Salts are Effective at Reducing Corrosion on Carbon Steel Ball Bearings The ability of sulfonium salts to reduce corrosion and sulfide generation on carbon steel surfaces exposed to sulfidogenic populations of microbes was tested using a mixture of salts comprising: triphenylsulfonium chloride (CAS #4270-70-6), diphenyl(4-phenlythio)phenlysulfonium chloride (CAS #80468-75-3), and (thiodi-4,1-phenylene)bis-diphenylsulfonium chloride (CAS #74815-63-7).

Carbon steel ball bearings were added to a tube containing the sulfidogenic microbes and 0, 10, 25, or 50 ppm of the sulfonium salt mixture, placed at 30-37° C. and treated for an average of 19 days.

Sulfide generation in the liquid portion of the tube was determined after 19 days using the LaMotte sulfide test kit (Code 4456-01) using the manufacturer's instructions. Corrosion levels on the carbon steel ball bearings were determined by using standard protocols to remove ion sulfide and scales. Each ball bearing was weighed before and after treatment with the sulfonium salts and exposure to the microbes to determine the weight loss. Overall corrosion rates, presented in (MPY) were calculated by multiplying the weight loss (in mg) by 3449 and then dividing the product by the product of D (density of the bearings in $g/cm^3$), A (an area of surface area expressed in $cm^2$) and T (length of the experiment in hours).

FIG. 1 depicts the average sulfide levels and corrosion rates for at least six independent experiments across the four different conditions. The results show a dose dependent reduction in both sulfide production (black bars) and corrosion rate (grey bars) as increasing concentrations of sulfonium salts are used.

Example 4

Effect of Sulfonium Salts in "Bubble Cells"

Bubble Cell Test Procedure

The effect of sulfonium salts as corrosion inhibitors was tested using standard bubble cell test procedures. The bubble test simulates low flow areas where little or no mixing of water and oil occurs. The test was conducted using 100% synthetic brine composed of 3% NaCl in water. The brine was placed into kettles and purged with carbon dioxide. The brine was continually purged with carbon dioxide to saturate the brine prior to starting the test. After the test began, the test cell was blanketed with carbon dioxide one hour prior to electrode insertion and through the duration of the test to maintain saturation. The kettles were stirred at 100 revolutions per minute (rpm) for the duration of the test to maintain thermal equilibrium at 50° C. The corrosion rate was measured by Linear Polarization Resistance (LPR) techniques. The working electrode used was 1018 carbon steel. The counter and reference electrodes were both Hastelloy. The electrodes were all cleaned with solvent prior to testing. Data were collected for four hours before each of the compositions was dosed into its respective cell. Data were collected overnight.

Figure 2:
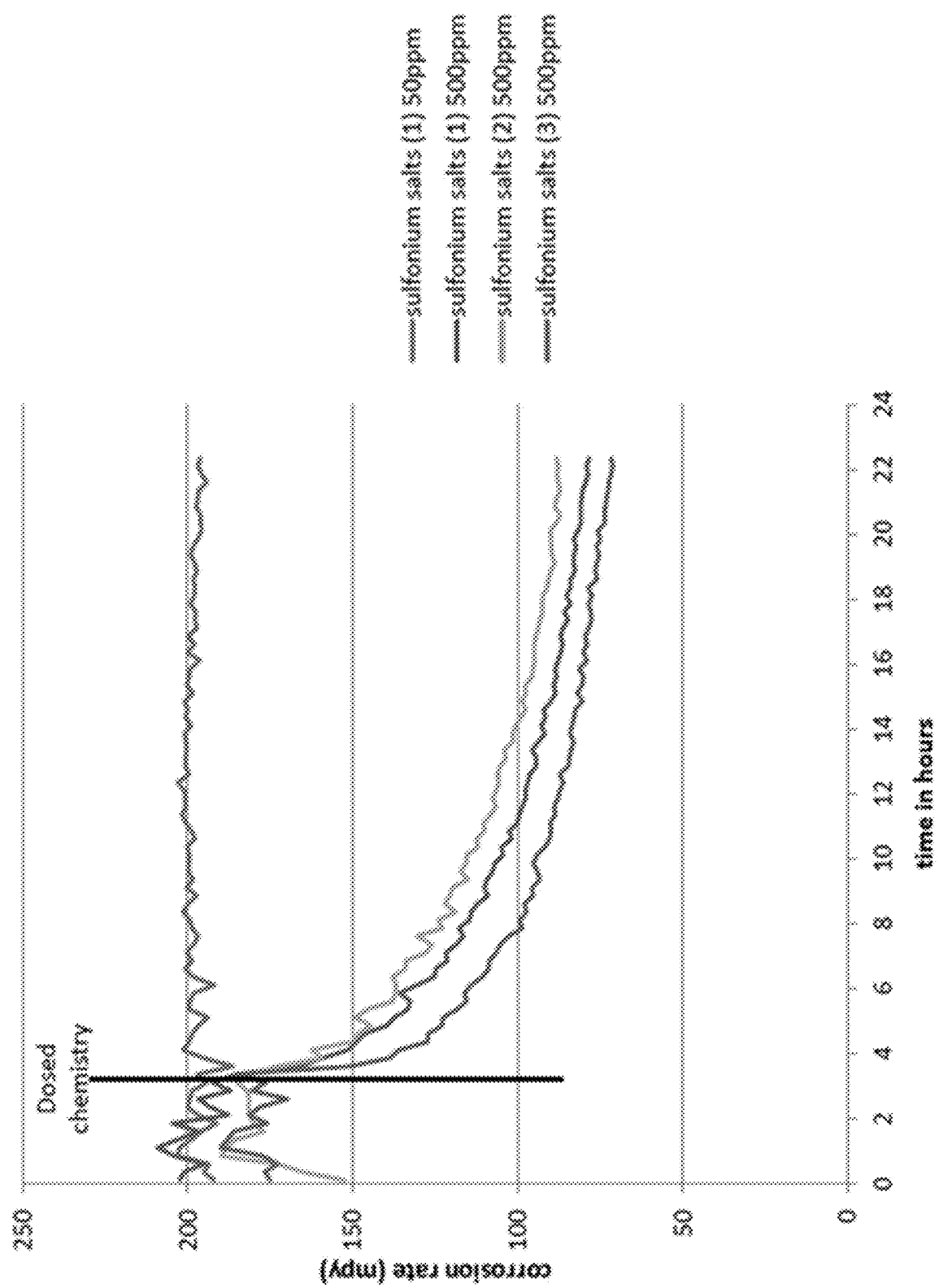
FIG. 2 depicts the corrosion rates measured for sulfonium salts dosed at 50 ppm or 500 ppm.

After collecting baseline corrosion rates in 3% NaCl for 3.7 hours, the sulfonium salts were dosed into bubble cells. Three different stocks of a mixture of sulfonium salts ((1), (2), and (3)) were tested. FIG. 2 depicts the corrosion rates (mpy) measured for sulfonium salts dosed at 50 ppm (one sample) or 500 ppm (three samples). Over time, there is a decrease in corrosion rates for the sulfonium salts dosed at 500 ppm, while the sulfonium salts dosed at 50 ppm does not increase the corrosion rate.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above methods without departing from the scope of the invention, it is intended that all matter contained in the above description shall be interpreted as illustrative and not in a limiting sense.

The invention claimed is:

1. A method of inhibiting corrosion at a surface, the method comprising contacting the surface with an effective amount of an anticorrosion composition comprising an aryl sulfonium salt or mixture of aryl sulfonium salts, wherein the aryl sulfonium salt comprises (i) a cation of Formula 2 or (ii) a dication of Formula 3, and the mixture of aryl sulfonium salts comprises (iii) a cation of Formulae 1 and 2, (iv) a cation of Formula 1 and a dication of Formula 3, (v) a cation of Formula 2 and a dication of Formula 3, or (vi) a cation of Formulae 1 and 2, and a dication of Formula 3,

1

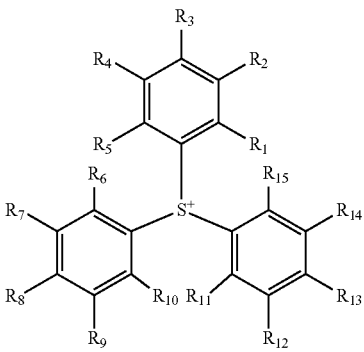

2

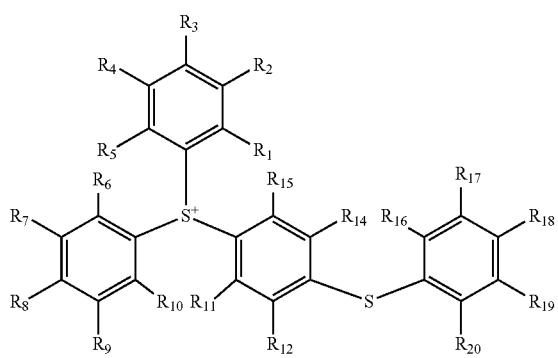

3

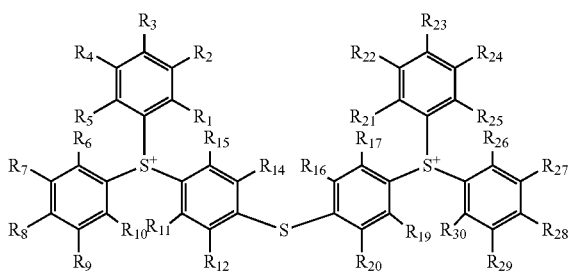

wherein $R_1$-$R_{30}$ are independently hydrogen, alkyl, alkoxy, aryl, or heterocyclo, and wherein the surface is in contact with a hydrocarbon-containing fluid.

2. The method of claim 1, wherein the anticorrosion composition inhibits microbially induced corrosion.

3. The method of claim 1, wherein the aryl sulfonium salt comprises a cation of Formula 2.

4. The method of claim 1, wherein the aryl sulfonium salt comprises a dication of Formula 3.

5. The method of claim 1, wherein the mixture of aryl sulfonium salts comprises a cation of Formulae 1 and 2.

6. The method of claim 1, wherein the mixture of aryl sulfonium salts comprises a cation of Formula 1 and a dication of Formula 3.

7. The method of claim 1, wherein the mixture of aryl sulfonium salts comprises a cation of Formula 2 and a dication of Formula 3.

8. The method of claim 1, wherein the mixture of aryl sulfonium salts comprises a cation of Formulae 1 and 2, and a dication of Formula 3.

9. The method of claim 8, wherein one to three of $R_1$-$R_{30}$ are independently alkyl and the balance are hydrogen.

10. The method of claim 8, wherein $R_1$-$R_{30}$ are hydrogen.

11. The method claim 1, wherein the counterion for the cation of Formula 1, cation of Formula 2, or dication of Formula 3 is chloride, bromide, fluoride, iodide, nitrate, perchlorate, sulfonate, carbonate, chromate, hexafluoroarsenate, hexafluorophosphate, p-toluenesulfonate, acetate, formate, oxalate, phosphate, or a combination thereof.

12. The method of claim 1, wherein the anticorrosion composition comprising the aryl sulfonium salt or mixture of aryl sulfonium salts in an aqueous solution is contacted with the surface and the aryl sulfonium salt or mixture of aryl sulfonium salts is administered in a concentration of from about 1 ppm to about 2000 ppm based on the total weight of the aqueous solution liquid.

13. The method of claim 12, wherein the concentration of the aryl sulfonium salt or mixture of aryl sulfonium salts is from about 5 ppm to about 500 ppm.

14. The method of claim 1, wherein the cation of Formula 1 is triarylsulfonium chloride, triarylsulfonium nitrate, triarylsulfonium bromide, triarylsulfonium fluoride, triarylsulfonium iodide, triarylsulfonium hexafluorophosphate, triarylsulfonium perchloroate, triaryl sulfonium sulfonate, triaryl sulfonium carbonate, triaryl sulfonium chromate, triarylsulfonium hexafluoroarsenate, triarylsulfonium p-toluenesulfonate, triarylsulfonium acetate, triarylsulfonium formate, triarylsulfonium oxalate, or triarylsulfonium phosphate; the cation of Formula 2 is diaryl (4-phenylthio)arylsulfonium chloride, diaryl (4-phenylthio)arylsulfonium fluoride, diaryl (4-phenylthio)arylsulfonium nitrate, diaryl (4-phenylthio)arylsulfonium bromide, diaryl (4-phenylthio)arylsulfonium iodide, diaryl (4-phenylthio)arylsulfonium hexafluorophosphate, diaryl (4-phenylthio)arylsulfonium perchloroate, diaryl (4-phenylthio)arylsulfonium sulfonate, diaryl (4-phenylthio)arylsulfonium hexafluoroarsenate, diaryl (4-phenylthio)arylsulfonium p-toluenesulfonate, diaryl (4-phenylthio)arylsulfonium acetate, diaryl (4-phenylthio)arylsulfonium formate, diaryl (4-phenylthio)arylsulfonium oxalate, or diaryl (4-phenylthio)arylsulfonium phosphate; and the dication of Formula 3 is (thiodi-4,1-phenylene)bis-diarylsulfonium dichloride, (thiodi-4,1-phenylene)bis-diarylsulfonium difluoride, (thiodi-4,1-phenylene)bis-diarylsulfonium dinitrate, (thiodi-4,1-phenylene)bis-diarylsulfonium dichloride dibromide, (thiodi-4,1-phenylene)bis-diarylsulfonium diiodide, (thiodi-4,1-phenylene)bis-diarylsulfonium dihexafluorophosphate, (thiodi-4,1-phenylene)bis-diarylsulfonium diperchloroate, (thiodi-4,1-phenylene)bis-diarylsulfonium disulfonate, (thiodi-4,1-phenylene)bis-diarylsulfonium dihexafluoroarsenate, diaryl (thiodi-4,1-phenylene)bis-diarylsulfonium di-p-toluenesulfonate, (thiodi-4,1-phenylene)bis-diarylsulfonium diacetate, (thiodi-4,1-phenylene)bis-diarylsulfonium diformate, (thiodi-4,1-phenylene)bis-diarylsulfonium dioxalate, or (thiodi-4,1-phenylene)bis-diarylsulfonium diphosphate.

15. The method of claim 14, wherein the cation of Formula 1 is triphenyl sulfonium chloride, the cation of Formula 2 is diphenyl (4-phenylthio)phenylsulfonium chloride, and the dication of Formula 3 is (thiodi-4,1-phenylene) bis-diphenylsulfonium dichloride.

16. The method of claim 14, wherein the cation of Formula 2 comprises diphenyl (4-phenylthio)phenylsulfonium chloride.

17. The method of claim 14, wherein the dication of Formula 3 comprises (thiodi-4,1-phenylene)bis-diphenylsulfonium dichloride.

18. The method of claim 1, wherein the hydrocarbon-containing fluid comprises natural gas or a liquid hydrocarbon.

19. The method of claim 18, wherein the liquid hydrocarbon comprises crude oil, heavy oil, processed residual oil, bituminous oil, cocker oil, gas oil, fluid catalytic cracker feed or slurry, naphtha, diesel fuel, fuel oil, jet fuel, gasoline, or kerosene.

* * * * *